(12) United States Patent
Swanson et al.

(10) Patent No.: US 8,553,846 B2
(45) Date of Patent: *Oct. 8, 2013

(54) PHONE TEST SET MODEM

(75) Inventors: Paul S Swanson, Monument, CO (US); Danny L Maupin, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,018

(22) Filed: Jun. 29, 2012

(65) Prior Publication Data

US 2013/0022177 A1    Jan. 24, 2013

Related U.S. Application Data

(63) Continuation of application No. 12/873,181, filed on Aug. 31, 2010, now Pat. No. 8,213,577.

(51) Int. Cl.
*H04M 1/24* (2006.01)
*H04M 3/08* (2006.01)
*H04M 3/22* (2006.01)

(52) U.S. Cl.
USPC .......................................... 379/21; 375/224

(58) Field of Classification Search
USPC ............. 379/1.01, 1.03, 12, 21, 22.04, 27.01; 375/213, 224, 225, 228
See application file for complete search history.

(56) References Cited

U.S. PATENT DOCUMENTS

| | | | | |
|---|---|---|---|---|
| 4,187,466 A | * | 2/1980 | Kasson et al. | 375/285 |
| 4,449,231 A | * | 5/1984 | Chytil | 704/258 |
| 4,777,605 A | * | 10/1988 | Pilkington | 702/77 |
| 5,799,060 A | | 8/1998 | Kennedy et al. | |
| 5,802,105 A | * | 9/1998 | Tiedemann et al. | 375/225 |
| 5,857,011 A | | 1/1999 | Kennedy et al. | |
| 6,144,721 A | | 11/2000 | Stephens | |
| 6,230,000 B1 | | 5/2001 | Tayloe | |
| 6,763,108 B1 | | 7/2004 | Stephens | |
| 7,116,093 B2 | * | 10/2006 | Johnson et al. | 324/76.28 |
| 2008/0033685 A1 | | 2/2008 | Shand | |
| 2008/0250278 A1 | | 10/2008 | Zellner et al. | |

OTHER PUBLICATIONS

D. Tayloe: Ultra Low Noise, High Performance, Zero IF Quadrature Product Detector and Preamplifier, Mar. 1, 2003.
D.R. Tayloe, "Ultra low noise, high performance, zero IF quadrature product detector and preamplifier," Jul. 10, 2004, http://wb9ipa.qrpradio.com/ 60meter /exciter/Tayloe_mixer _x3a .pdf.

* cited by examiner

*Primary Examiner* — Binh Tieu
(74) *Attorney, Agent, or Firm* — Edwards Wildman Palmer LLP; Scott D. Wofsy; Christopher J. Capelli

(57) ABSTRACT

A phone test set provides modem capability in a hand held device, enabling bi-directional data communications. Demodulation is provided by sampling digitized incoming phone line signals at 4 times carrier frequency, and employing values representing 0 and 90 degree samples to extract the information signal.

20 Claims, 5 Drawing Sheets

US 8,553,846 B2

PHONE TEST SET MODEM

CROSS-REFERENCE TO RELATED APPLICATIONS

This application is a continuation of U.S. patent application Ser. No. 12/873,181, filed Aug. 31, 2010.

BACKGROUND OF THE INVENTION

This invention relates to test and measurement data communications and more particularly to a phone test set modem apparatus and method.

Communications field service technicians in the telephone industry use a test instrument called a phone test set or lineman's handset. The phone test set typically comprises ear and mouthpieces and keyboard for dialing input. Some models include alphanumeric displays.

The test set is used by the technician in the installation and troubleshooting of analog phone systems. FIG. 1 is a view of a contemporary phone test set 10 which is a hand held device comprising an input keypad 12 and alphanumeric display 14. Microphone 16 and speaker 18 enable the technician to speak and listen to use the device as a telephone. Cables 20 connect alligator clips 22, 24 and modular plug 26 to the test set to enable connection to telephone wiring of the phone systems under test. The test set typically will include features such as caller ID and call waiting caller ID. What has been missing from phone test sets is the capability for bi-directional alphanumeric data communication between the test set and other devices connected to the phone line.

SUMMARY OF THE INVENTION

In accordance with the invention, a phone test set is provided with modem functionality to enable digital communication between the test set and other devices connected remotely through the phone lines.

Accordingly, it is an object of the present disclosure to provide an improved phone test set with digital communication capability.

It is a further object of the present disclosure to provide an improved phone test set apparatus providing bi-directional alphanumeric data communication in addition to telephone capabilities.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present disclosure comprises a phone test set system and method providing modem capabilities to enable the test set as a bi-directional alphanumeric data communication terminal.

Figure 1:
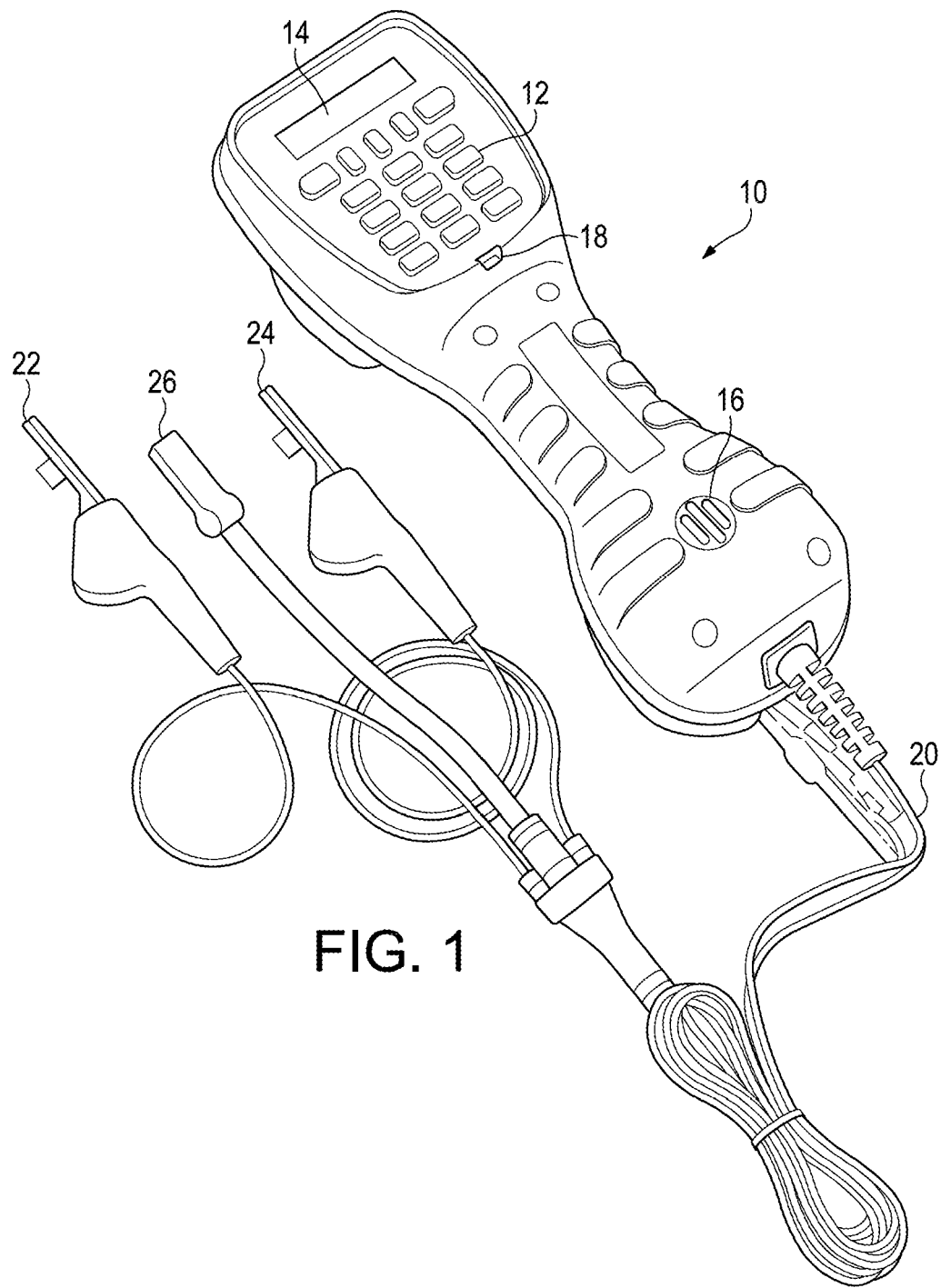
FIG. 1 is a view of a contemporary phone test set
Figure 2:
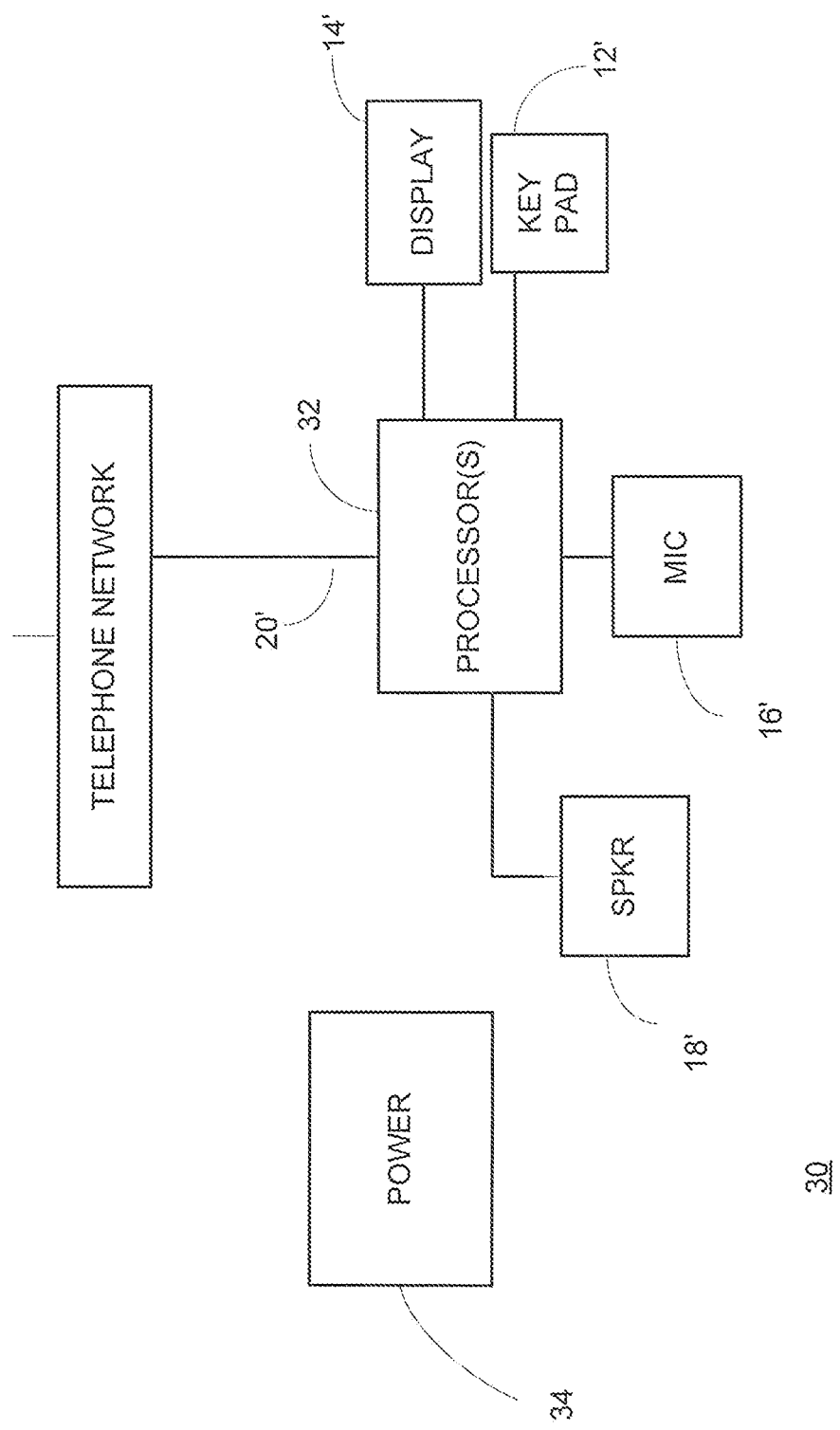
FIG. 2 is a block diagram of a phone test set in accordance with the present disclosure.

FIG. 2 is a block diagram of a phone test set in accordance with the present disclosures. The test set 30 employs a processor 32 interfacing with keypad 12', display 14', microphone 16', speaker 18' and interface cables 20' for connection to a phone network. Power block 34 provides operational power to the device, and may comprise battery power, or line power, for example. Within the processor, an implementation is provided of a modulator/demodulator to interface with the phone line for receiving input signals for demodulation, and with the processor for providing demodulated data to the processor. Also, the processor modulator implementation supplies data for transmission back to the phone line 20'. Alternatively, in a particular embodiment, the modulator may be separate from the processor.

Figure 3:
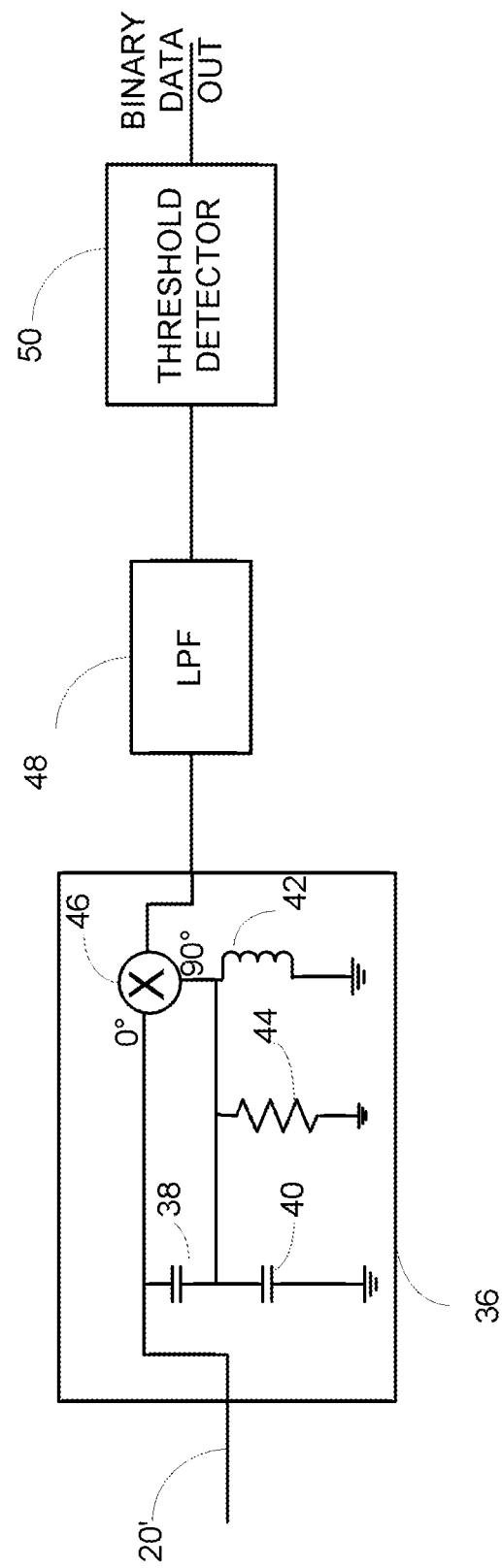
FIG. 3 is a block diagram of a demodulation device for FSK signals.

FIG. 3 is a block diagram illustrating a demodulation device for FSK signals, wherein input, from phone line 20' is provided to an FM discriminator 36. The discriminator if implemented in hardware comprises a phase splitter (capacitors 38, 40, inductor 42 and resistor 44) and multiplier 46, to receive the original signal and phase shifted signal (90 degrees) and the output thereof is supplied to Low Pass Filter 48. The output from Low Pass Filter 48 is supplied to a threshold decision block 50, which determines whether the signal represents a one or zero, depending on the level value of the signal. The resulting output from block 50 is a binary data pattern of ones and zeros, which is supplied to processor 32 which implements a universal synchronous/asynchronous receiver/transmitter (USART). The incoming signal suitably represents and ASCII data stream, so the processor USART decodes the data providing the character stream data as input to suitable software for reading the data. The data may comprise caller ID information or, more importantly, any data stream such as text or command/control data for communicating between the test set and a remote device over the phone line, such as another test set or a test instrument at a remote location.

Tayloe discusses an analog product detector, in U.S. Pat. No. 6,230,000, wherein an input analog signal is passed through a commutating switch with 4 outputs, each output being connected for successive 90 degree portions of the frequency of the input signal, supplied to detecting capacitors. Each of the 4 capacitors provides baseband product detection values at 0, 90, 180 and 270 degrees of the input. The 0 and 90 degree outputs multiplied provide the original information signal.

Figure 4:
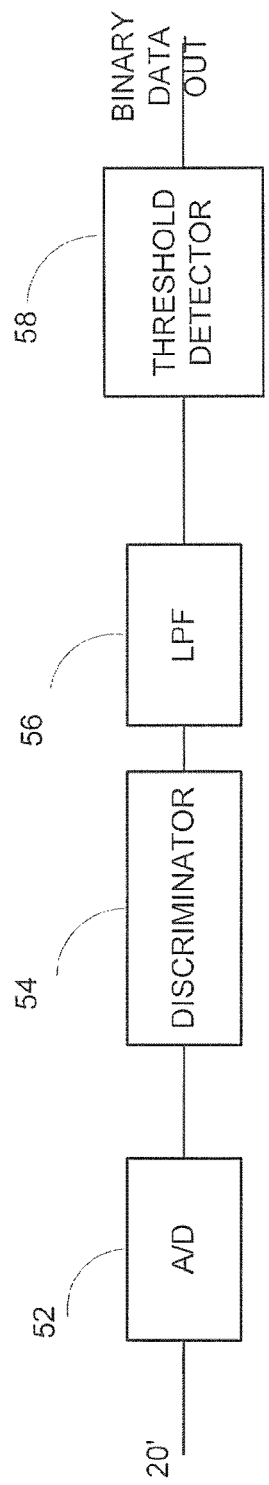
FIG. 4 is a block diagram of implementation of the demodulation in the present device.
Figure 5:
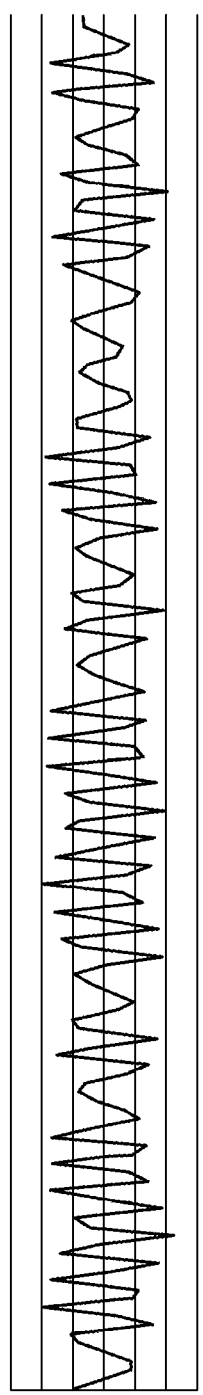
FIG. 5 is a diagram illustrating an example digitized signal input to the low pass filter.
Figure 6:
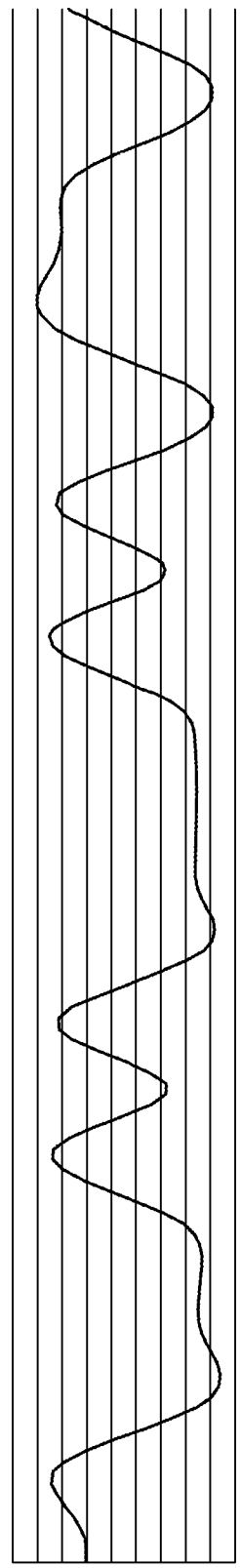
FIG. 6 is a diagram illustrating an example signal output from the Low Pass Filter.
Figure 7:
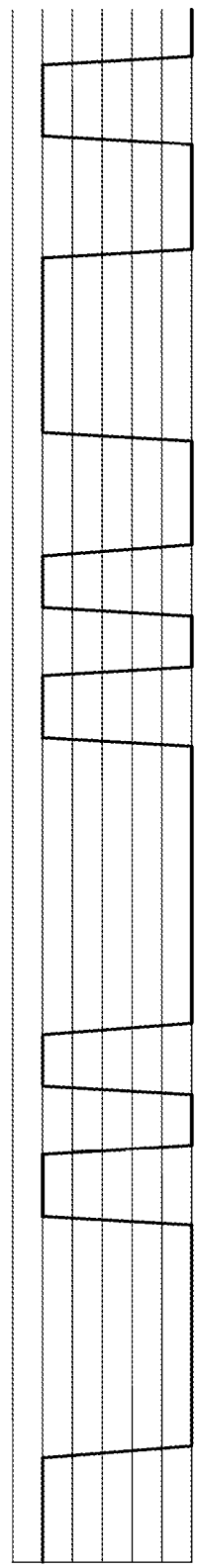
FIG. 7 is a diagram illustrating an example signal output from the threshold decision block.

The above FM discriminator can be implemented algorithmically with a digital system. Referring to FIG. 4, a block diagram of the implementation, in a preferred embodiment, incoming signals from phone line 20 are sampled at 4 times the carrier rate by A to D converter 52. The signals are suitably FSK signals in a particular embodiment, comprising 1200 and 2200 Hz, and sampling of the incoming signals is done at 6800 Hz (assuming a carrier frequency of 1700 Hz being the average of the 2 frequencies (1200+2200)/2)). Sampling at four times the carrier frequency provides sufficient data to create the FM discriminator mathematically. FIG. 5 illustrates an example sampled signal output from A to D converter 52. Synthetic discriminator 54 receives the 4 times carrier rate sample data, and a current sample datum from the A to D is multiplied by a previous sample datum from the A to D, which represents the sample 90 degrees prior to the current sample, providing the output function of an FM discriminator by multiplying the 0 and 90 degree signal samples, for example. The output of discriminator 54 is passed through a Low Pass Filter 56, a 5 pole ButterWorth LPF in the particular embodiment, an example of the filtered output being illustrated in FIG. 6. The LPF output is then supplied to a threshold detector 58, which determines whether the value represents a one or zero data bit and that output is suitably provided to the processor which implements a USART, for decoding of ASCII data therefrom. FIG. 7 illustrates example resulting output data of the threshold detection.

For transmission of data from the test set to the phone line, a modulator is provided to FSK encode data as supplied by the processor to transmit the same on the phone line.

In a particular embodiment, an anti-aliasing low pass filter (suitably 4 kHz) is provided at the input of the A to D converter to remove noise above the telephone speech band. The processor can comprise, for example, a Microchip Corporation PIC24FJ128GA110 microcontroller, or other processor with analog to digital converter, USART and baud rate clock generator capability.

The A to D, sampling, algorithmic FM discrimination, low pass filtering and USART functions can all be implemented by operation of the processor. The A to D sampling of the phone line signals is made and the resulting samples are employed to an FM discriminator function that employs the 90 degree out of phase signals to compute the demodulated data value. That resulting value is supplied to a programmed low pass filter, and the output of the filter is supplied to a threshold detection function, which provides the zero and one data output to the USART input, for decoding of ASCII data (for example).

Accordingly data communication reception of FSK signals is provided to the phone test set, as well as transmission of the same, enabling the phone test set to operate as a digital smart terminal or to transmit or receive commands and control remotely.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A phone test set comprising:
    an A to D converter for receiving incoming phone line signals and providing digitized output of the incoming phone line signals sampled at a multiple of a desired frequency; and
    a discriminator receiving said digitized output and multiplying ones of said samples together to extract a signal of interest from said incoming phone line signals.

2. The phone test set according to claim 1, wherein said phone test set comprises a hand held 'butt set'.

3. The phone test set according to claim 1, further comprising a threshold detector receiving said extracted signal of interest and providing a binary output representation of said extracted signal of interest.

4. The phone test set according to claim 1, further comprising a low pass filter receiving said signal of interest from said discriminator to provide a low pass filtered version thereof.

5. The phone test set according to claim 4, further comprising a threshold detector receiving said low pass filtered version of said signal and providing a binary output representation of the input thereto.

6. The phone test set according to claim 5, further comprising a universal synchronous/asynchronous receiver/transmitter receiving said binary output representation and providing an ASCII value output represented thereby.

7. The phone test set according to claim 3, further comprising a universal synchronous/asynchronous receiver/transmitter receiving said binary output representation and providing an ASCII value output represented thereby.

8. The phone test set according to claim 1, wherein said digitizing is at approximately 6800 Hz.

9. The phone test set according to claim 1 wherein said signals of interest are 1200 and 2200 Hz.

10. A method of providing a phone test set with a modem to extract information modulated onto a signal on a phone line, comprising:
    A to D converting an input signal to the phone test set to provide digitized samples of the signal on the phone line to the phone test set;
    providing said digitized samples selected at a multiple of a carrier frequency of interest; and
    multiplying ones of said digitized samples representing 90 degree out of phase samples to extract said information modulated onto the signal.

11. The method according to claim 10, further comprising threshold detecting said extracted signal of interest and providing a binary output representation of said extracted signal of interest.

12. The method according to claim 10, further comprising a low pass filtering said signal of interest from said discriminator to provide a low pass filtered version thereof.

13. The method according to claim 12, further comprising threshold detecting said low pass filtered version of said signal and providing a binary output representation of the input thereto.

14. The method according to claim 13, further comprising providing a universal synchronous/asynchronous receiver/transmitter receiving said binary output representation and providing an ASCII value output represented thereby.

15. The method according to claim 11, further comprising providing a universal synchronous/asynchronous receiver/transmitter receiving said binary output representation and providing an ASCII value output represented thereby.

16. The method according to claim 10, wherein said carrier frequency is approximately 1700 Hz.

17. The method according to claim 10, wherein said information comprises signals at 1200 and 2200 Hz.

18. A hand held phone test set comprising:
    an A to D converter for receiving incoming signals on a phone line and providing digitized output of the incoming phone line signals sampled at a multiple of a desired frequency; and
    a processor receiving said digitized output and implementing a discriminator, multiplying ones of said samples together to extract a signal of interest from said incoming phone line signals, said processor further implementing a threshold detector receiving said extracted signal of interest and providing a binary output representation of said extracted signal of interest, said processor further implementing a universal synchronous/asynchronous receiver/transmitter receiving said binary output representation and providing an ASCII value output represented thereby.

19. The hand held phone test set according to claim 18, further comprising a modulator for modulating data and transmitting outgoing signals on the phone line.

20. The phone test set according to claim 18, wherein said sampling is at approximately four times a carrier frequency of a sampled baseband signal.

\* \* \* \* \*